United States Patent
Zhou et al.

(10) Patent No.: US 8,999,898 B2
(45) Date of Patent: Apr. 7, 2015

(54) DRILLING FLUID ADDITIVE FOR LOSS CIRCULATION AND WELLBORE STRENGTHENING

(71) Applicant: Superior Graphite Co., Chicago, IL (US)

(72) Inventors: Changjun Zhou, Chicago, IL (US); David J. Derwin, Prospect Heights, IL (US); Frank A. Wawrzos, McHenry, IL (US)

(73) Assignee: Superior Graphite Co., Chicago, IL (US)

( * ) Notice: Subject to any disclaimer, the term of this patent is extended or adjusted under 35 U.S.C. 154(b) by 0 days.

(21) Appl. No.: 13/836,636

(22) Filed: Mar. 15, 2013

(65) Prior Publication Data

US 2014/0274816 A1    Sep. 18, 2014

(51) Int. Cl.
| | |
|---|---|
| *C09K 8/00* | (2006.01) |
| *C09K 8/05* | (2006.01) |
| *C09K 8/14* | (2006.01) |
| *C09K 8/03* | (2006.01) |
| *C09K 8/035* | (2006.01) |
| *C09K 8/50* | (2006.01) |

(52) U.S. Cl.
CPC .......... *C09K 8/032* (2013.01); *C09K 8/035* (2013.01); *C09K 8/50* (2013.01)

(58) Field of Classification Search
USPC ................................. 507/140, 100
See application file for complete search history.

(56) References Cited

U.S. PATENT DOCUMENTS

| | | |
|---|---|---|
| 2,329,878 A | 10/1943 | Cerf |
| 2,667,224 A | 1/1954 | Howard |
| 2,912,380 A | 11/1959 | Groves |
| 3,385,789 A | 5/1968 | King et al. |
| 3,444,276 A | 5/1969 | Olstowski et al. |
| 3,807,961 A | 4/1974 | Markel |
| 4,069,870 A | 1/1978 | Gallus |
| 4,088,583 A | 5/1978 | Pyle et al. |
| 4,114,692 A | 9/1978 | Gallus |
| 4,160,813 A | 7/1979 | Markel et al. |
| 4,501,329 A | 2/1985 | DePriester |
| 4,531,594 A | 7/1985 | Cowan |
| 4,957,174 A | 9/1990 | Whitfill et al. |
| 5,118,664 A | 6/1992 | Burts, Jr. |
| 5,211,250 A | 5/1993 | Kubena, Jr. et al. |
| 5,401,719 A | 3/1995 | DeBeer |
| 5,599,776 A | 2/1997 | Burts, Jr. |
| 5,826,669 A | 10/1998 | Zaleski et al. |
| 5,839,520 A | 11/1998 | Maillet |
| 5,843,872 A | 12/1998 | Rayborn, Sr. et al. |
| 5,942,467 A | 8/1999 | Rayborn, Sr. et al. |
| 6,461,999 B1 | 10/2002 | Fanta et al. |
| 7,402,338 B2 | 7/2008 | Weintritt et al. |
| 7,666,469 B2 | 2/2010 | Weintritt et al. |
| 8,048,515 B2 * | 11/2011 | Nishiwaki et al. ......... 428/314.2 |
| 2003/0132000 A1 | 7/2003 | Shaarpour |
| 2006/0096759 A1 | 5/2006 | Reddy et al. |
| 2006/0122070 A1 | 6/2006 | Halliday et al. |
| 2007/0054121 A1 | 3/2007 | Weintritt et al. |
| 2009/0075847 A1 | 3/2009 | Wawrzos et al. |
| 2009/0221452 A1 | 9/2009 | Whitfill et al. |

FOREIGN PATENT DOCUMENTS

| | | |
|---|---|---|
| GB | 1 532 922 | 11/1978 |
| WO | WO 91/18077 | 11/1991 |
| WO | WO 97/22677 | 6/1997 |
| WO | WO 2004/092301 | 10/2004 |

OTHER PUBLICATIONS

International Search Report and Written Opinion for PCT/US2014/018656, mailed Apr. 4, 2014.

* cited by examiner

*Primary Examiner* — Susannah Chung
*Assistant Examiner* — Atnaf Admasu
(74) *Attorney, Agent, or Firm* — Cook Alex Ltd.

(57) ABSTRACT

A method for controlling the loss of drilling fluid from an oil well borehole into formations penetrated by a drill bit is disclosed by which resilient graphitic carbon particles having a resiliency greater than about 130% rebound after compression to 10,000 psi; a degree of graphitization greater than 85%, as measured by d002 using XRD; an average pore size larger than 0.035 micron; and an aspect ratio smaller than 0.63 are added to the drilling fluid.

1 Claim, No Drawings

DRILLING FLUID ADDITIVE FOR LOSS CIRCULATION AND WELLBORE STRENGTHENING

BACKGROUND

In the oil and gas industry, a common problem in drilling operations is the loss of valuable drilling fluids into fractures induced by excessive mud pressure, preexisting open porosity/fractures or large caverns in the formation.

One of the methods to prevent loss event from happening or stop the loss is via addition of granular particles into the drilling fluid, which act as bridging agent to establish the foundation for complete sealing of the fracture or as wellbore strengthening materials that pop the fracture open. Such materials include graphite, petroleum coke, walnut shell, calcium carbonate, among others.

Superior Graphite Co. introduced resilient graphitic carbon for use as an LCM in the 1990s (see, U.S. Pat. No. 5,826,669, incorporated herein by reference). The resilient graphite is believed capable of packing tightly under compression in the pores and fractures, to expand or contract without being dislodged or collapsed due to changes in the equivalent circulating density or with an increase in fluid weight. In addition, graphite also worked as solid lubricant to reduce wear of metal components and improve drilling efficiency. The graphitic materials described in the '669 patent have a resiliency/rebound higher than 35% upon compression at 10,000 psi, with particle density from 1.45-2.2 gram/cc. Such an RGC material for use as an LCM is commercially available under the trade name STEELSEAL® from Halliburton Inc. The STEELSEAL® additive is manufactured by Superior Graphite Co and is considered as standard practice of U.S. Pat. No. 5,826,669. While such resilient graphitic carbon materials have provide superior LC control, improvement in performance is desirable.

SUMMARY

The present invention relates to an improved resilient graphitic carbon material and its use as a LCM. While produced by similar process to that described in the '669 patent, the improved RGC is made from a specially-sourced raw material that results in a unique needle like morphology, with significantly higher resiliency, porosity and lower density than previously-available resilient graphitic carbons. Permeability plugging test demonstrated that it formed a tighter seal by itself and with other loss circulation materials.

More specifically, in one aspect, the improved RGC material has needle-like morphology which is significantly different from the STEELSEAL® product identified above. The aspect ratio was measured at 0.60 for HR grade, compared with STEELSEAL® 400 at 0.63. (Spherical materials have an aspect ratio of 1).

In another aspect, the improved RGC material has a resiliency in the range from 138-145% at 400 size, compared with STEELSEAL® 400 at 100-130%.

In a further aspect, the true density of the improved material is in the range 1.49-1.53 gram/cc at 400 size, compared with STEELSEAL® 400 typically at 1.56-1.62 gram/cc.

In another aspect, the degree of graphitization of the improved RGC is greater than 85%, and samples have been measured at 87.9% for the improved RGC material, compared with STEELSEAL® 400 at 79.8%.

In a still further aspect the porosity of the improved RGC material (as represented by the total pore volume) was measured at 0.43 cc/gram, compared with STEELSEAL® 400 at 0.24 cc/gram, or 76% higher.

These aspects are set forth in greater detail below.

DETAILED DESCRIPTION

The improved RGC material for use as an LCM in accordance with the present disclosure is distinguishable over prior art materials in a number of characteristics, including (but not necessarily limited to) porosity, resiliency, degree of graphitization and morphology (as indicated by aspect ratio). These characteristics are discussed in greater detail below.

Porosimetry Testing:

Porosimetry testing involves the intrusion of a non-wetting liquid (often mercury) at high pressure into a material through the use of a porosimeter. The pore size can be determined based on the external pressure needed to force the liquid into a pore against the opposing force of the liquid's surface tension.

A force balance equation known as Washburn's equation for the above materials having cylindrical pores is given as:

$$\text{Pressure} = \frac{4\sigma \cos\theta}{D_P}$$

Where $D_P$ is pore size, $\sigma$ is surface tension of mercury and $\theta$ is the contact angle. For mercury, without getting into details, approximately $$\text{Pressure}(Psi) = \frac{\sim 213}{D_P(\text{in micron})}.$$

With reference to Table 1, below, samples of the improved RGC of the present disclosure (designated "HR") and the prior art material (designated "SS") having comparable particle size distributions (as determined by Microtrac analysis) were tested for their porosity. Testing was conducted following ISO 15901-1, and started at 0.52 psi with a peak pressure of 70,000 psi gauge. Liquid mercury was pushed into pores by hydraulic force. The amount of mercury received in the pores was measured as a function of pressure. With the increase in pressure, more and more mercury is pushed into the pores of the sample material. From the pressure data, pore size is calculated. As a result, pore volume information as a function of pore size is obtained.

TABLE 1

| Sample | Total Intrusion Volume, ml/gram | Median Pore Diameter (Volume), micron | Porosity, % |
|---|---|---|---|
| HR10 | 0.5328 | 0.1232 | 52.0339 |
| HR19 | 1.0398 | 113.0871 | 70.5732 |
| HR22 | 1.3788 | 9.2583 | 75.0394 |
| SS10 | 0.3569 | 0.0440 | 45.1615 |
| SS19 | 0.9448 | 112.2404 | 66.3028 |
| SS22 | 1.0513 | 7.2828 | 69.1102 |

From the data, it is seen that at the same size, the HR material gives higher total pore volume. For example HR10 has a porosity 52%, while SS10 has a porosity 45%. From the log differential of pore volume vs. pore size, it appears that information collected at pore size larger than 1 micron or pressure lower than about 200 psi is irrelevant to the determination of porosity, as they are related to interparticle space. In Table 2, below, only data relating to a pore size of less than 0.35 micron is considered:

TABLE 2

| Sample | Total Intrusion Volume, ml/gram | Median Pore Diameter (Volume), micron | Porosity, % |
|---|---|---|---|
| HR10 | 0.2922 | 0.0429 | 37.3 |
| HR19 | 0.2736 | 0.0388 | 38.7 |
| HR22 | 0.1929 | 0.0476 | 29.6 |
| SS10 | 0.2394 | 0.0272 | 35.6 |
| SS19 | 0.2297 | 0.0290 | 32.4 |
| SS22 | 0.1456 | 0.0300 | 23.7 |

While the porosity values in Table 2 are questionable with respect to some of the skeleton density values that are out of range, the remainder of Table 2 is believed to be fairly accurate.

From Table 2, it can be concluded that the HR materials possess a higher total fine porosity than the SS materials having a comparable particle size distribution. Further, the larger the particle size, the higher the total porosity, and all HR materials have larger pores than the SS materials. All HR materials have a median pore diameter larger than 0.0388 micron, while all SS materials have an average pore size smaller than 0.0300 micron.

Resiliency Testing

Resiliency testing is described in the '669 patent, incorporated by reference above. As described therein, resiliency may be determined by use of a press by which pressure is applied to an un-compacted sample of material and released. More specifically, a test cylinder or die is loaded with a dry and free flowing amount of the material to be tested. The test cylinder is then mounted onto a press. Pressure is applied by the press to the sample (to 10,000 psi) and the height of the compacted sample ($h_o$) within the test cylinder is measured. The pressure is then released and the rebounded height of the sample in the test cylinder ($h_r$) is measured at 10 minutes after pressure is released, and then again at 20 minutes to make sure that the sample has stabilized. The resiliency (%) is then calculated as $100\times(h_r/h_o-1)$.

Degree of Graphitization and Aspect Ratio

Degree of graphitization of carbon and graphite products is measured by X-Ray Diffraction (XRD). It is calculated using the following formula:

$$g = \frac{0.3440 - d_{002}}{0.3440 - 0.3354} \times 100$$

Where g is the degree of graphitization (%) and $d_{002}$ is the interlayer spacing derived from XRD.

Aspect ratio is the ratio of the width to the height of a particulate. Images of individual particulates were captured and analyzed to determine aspect ratio of the product. Aspect ratio measurement is an imaging analysis service commercially provided by Microtrac Inc (DIA).

Thus, an improved highly resilient graphitic carbon material particularly suited for use as a drilling fluid additive has been described. The highly resilient graphite is produced from calcined petroleum coke that is heat treated using a continuous fluid bed thermal purification process. The resultant material has a degree of graphitization greater than 85%, as measured by d002 using XRD, (in comparison to the degree of graphitization of prior art products of generally lower than 80%). Further, the resultant material develops a high level of microporosity, characterized by larger pore diameter, as measured by mercury porosimetry testing methods. Specifically, median pore diameter (micro-pore, <1 micron) with respect to volume of this highly resilient graphite is bigger than 0.035 micron regardless of particle size. In addition, the highly resilient graphite has resiliency levels in excess of 130%, (while prior art products have a resiliency of generally less than 130%).

Particle Size Distribution

The highly resilient graphite has a particle size bigger than about 10 micron in d50 and less than 2380 micron (8 mesh), so that it is big enough to form an effective formulation together with other mud components such as barite but not too big to plug downhole tools.

The invention claimed is:

1. A method for controlling the loss of drilling fluid from an oil well borehole into formations penetrated by a drill bit comprising adding to the drilling fluid resilient graphitic carbon particles wherein the particles have a resiliency greater than about 130% rebound after compression to 10,000 psi; a degree of graphitization greater than 85%, as measured by d002 using XRD; an average pore size larger than 0.035 micron; and an aspect ratio smaller than 0.63.

* * * * *